Figure 1:
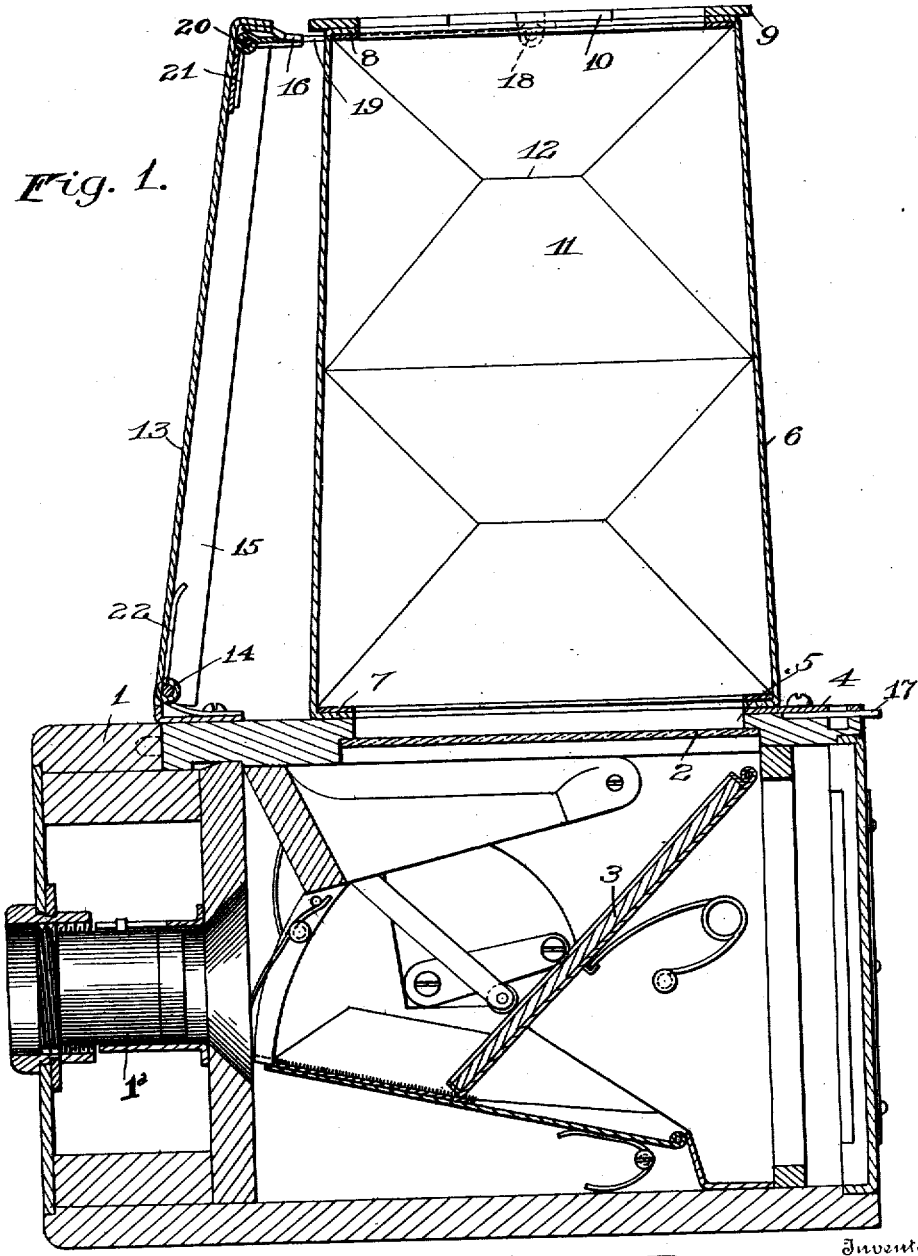

C. E. HUTCHINGS.
PHOTOGRAPHIC CAMERA.
APPLICATION FILED APR. 8, 1907.

1,024,200.

Patented Apr. 23, 1912.
2 SHEETS—SHEET 1.

Witnesses
Walter B. Payne
Florence E. Franck

Inventor
Charles E. Hutchings
By
His Attorneys

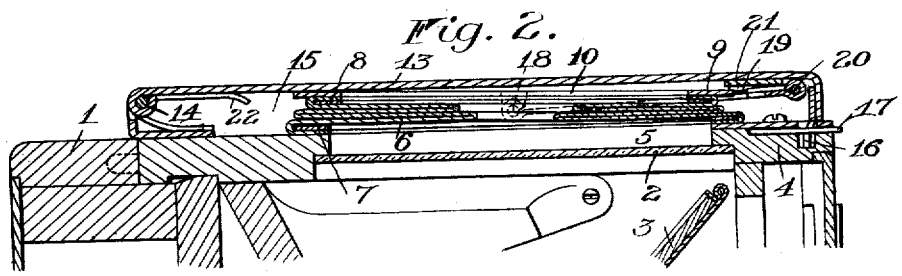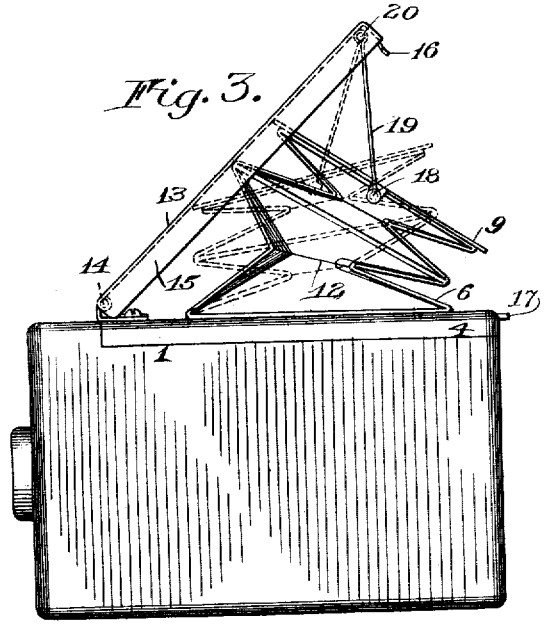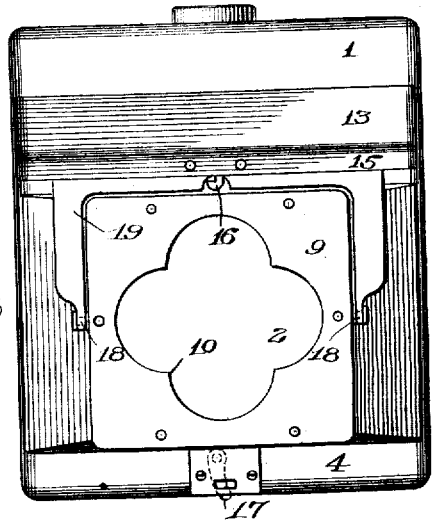

UNITED STATES PATENT OFFICE.

CHARLES E. HUTCHINGS, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

PHOTOGRAPHIC CAMERA.

1,024,200.  Specification of Letters Patent.  Patented Apr. 23, 1912.

Original application filed October 22, 1906, Serial No. 339,911. Divided and this application filed April 8, 1907. Serial No. 366,940.

*To all whom it may concern:*

Be it known that I, CHARLES E. HUTCHINGS, of Rochester, in the county of Monroe and State of New York, have invented certain new and useful Improvements in Photographic Cameras; and I do hereby declare the following to be a full, clear, and exact description of the same, reference being had to the accompanying drawings, forming a part of the specification, and to the reference-numerals marked thereon.

My present invention relates to photographic cameras and particularly to that type having a focusing screen on which the image may be viewed, and it has for its object to provide a hood or shield for shading the screen which is adapted to be used in lieu of the usual focusing cloth or head covering employed by photographers for this purpose to enable them to obtain clear cut and well defined images.

The invention has for its further object to provide a collapsible hood which is adapted to be attached to the camera body and is capable of opening automatically into operative position when it is released.

To these and other ends the invention consists in certain improvements and combinations of parts all as will be hereinafter more fully described, the novel features being pointed out in the claims at the end of the specification.

In the drawings: Figure 1 is a vertical sectional view of a camera illustrating a device embodying my invention applied thereto. Fig. 2 is a similar view showing the parts collapsed. Fig. 3 is an elevation illustrating the device in one position of adjustment, and Fig. 4 is a top plan view.

In illustrating my present invention I have shown it applied to a camera such as that shown in a prior application filed by me on the 22d day of October, 1906, bearing Serial No. 339,911, of which this case is a division. The camera illustrated is one embodying a casing 1, in which the rays of light entering the opening 1ª in the front of the camera or passing through the lens located therein, as the case may be, are reflected upon a focusing screen 2 by means of a mirror or other reflecting surface 3, but it will be understood that the hood may be used with equal advantage with other well known forms of cameras in which the focusing screens are arranged in alinement with the axis of the opening or lens.

The support or frame containing the focusing screen is indicated by 4 and the aperture therein through which it may be viewed is indicated by 5. The hood or shield 6 surrounds the latter and at its inner end it is provided with inwardly turned edges 7 attached to the frame and at its outer end are similar edges 8 which are secured to a frame 9 having a central aperture 10 of any suitable dimensions. The hood or shield is tubular in form and is preferably rectangular in cross section, each of its four sides being divided into a plurality of panels 11, defined by scored lines 12 on which the several panels may be folded to permit the hood to be collapsed against the camera casing, as shown in Fig. 2. Means are provided for extending or opening the hood and holding it in t is position when the operator so desires, which in the present instance is combined with the closure 13 adapted to normally cover the hood when it is collapsed and form a closure for the aperture in frame 4. The closure is hinged to the latter at one edge as indicated at 14, and comprises a back and depending side flanges 15 on one of which is a latch piece 16 coöperating with a spring operated finger piece or latch 17, which normally holds the closure in the position shown in Fig. 2. The frame 9 is provided at opposite sides with journals 18 to which are connected the arms of a yoke piece 19 hinged at the point 20 to the inner side of the closure 13. The yoke piece is normally operated into a horizontal position by means of a spring 21 and the cover when released, is swung upwardly on its hinge by a similar spring 22. The pivotal connection of the arms on the door or closure and the hood frame permits the movement of the former in the arc of a circle and the projection and retraction of the latter in a straight line, for as the hood frame is moved relatively toward the focusing screen frame the connecting arms revolve and their points of attachment 20 on the door or closure pass over the hood from the position shown in Fig. 1 to that shown in Fig. 2. During this movement, which occurs simultaneously with the closing movement of the door, both the springs 21 and 22 are placed under tension in readiness to move the hood outwardly when the latch 17 is released.

A hood or shield constructed in accordance with my invention is simple in construction and consists of few parts which may be readily applied to cameras heretofore constructed. By reason of its construction in tubular form the rays of light are excluded from all sides of the focusing screen, permitting the image thereon to be seen distinctly and its capability of collapsing into a comparatively small space permits its application to a camera as a permanent part thereof.

I claim as my invention:

1. The combination with a focusing screen, of a tubular hood surrounding the screen, said hood being collapsible longitudinally in the direction of the latter to a position in which its intermediate portion is disposed as an entirety between its two extreme ends, a cover for the screen and for the hood when collapsed and means for automatically projecting the outer end of the hood from the screen when the cover is opened.

2. The combination with a focusing screen, of a tubular hood surrounding the screen, said hood being collapsible longitudinally in the direction of the latter to a position in which its intermediate portion is disposed as an entirety between its two extreme ends, a hinged cover for the screen and for the hood when collapsed, and means for automatically projecting the outer end of the hood to extend the latter in a direction substantially at right angles to the screen when the cover is raised.

3. The combination with a focusing screen, of a tubular hood surrounding the screen, said hood being collapsible longitudinally in the direction of the latter to a position in which its intermediate portion is disposed as an entirety between its two extreme ends, a cover for the screen and for the hood when collapsed, and connections between the cover and the outer end of the hood for automatically extending the latter by the opening of the cover.

4. The combination with a camera focusing screen, and a hood surrounding the screen and collapsible in the direction thereof, of means for supporting the hood in extended position comprising a member hinged at one side of the screen and revoluble outwardly therefrom, and a rigid connecting link pivoted to the outer end of the hood and to the member permitting the hood to be folded to a position in which its intermediate portion is disposed as an entirety between its two ends.

5. The combination with a camera focusing screen, and a tubular hood surrounding the screen and collapsible into engagement therewith to a position in which its intermediate portion is disposed as an entirety between its two ends, of means for supporting the hood in extended position comprising a spring-operated member hinged at one side of the screen and revoluble outwardly therefrom, an arm pivotally connected at one end to the hood and at its opposite extremity to the member and a spring for rotating the arm outwardly away from the member.

6. The combination with a camera focusing screen, a hood surrounding the screen and collapsible longitudinally, and a frame attached to the outer end of the hood, of a closure adapted to cover the hood when in collapsed position pivoted at one side of the screen, supporting arms pivoted at a central point to the hood frame and to the closure and springs for respectively rotating the closure into an open position and moving the arms outwardly therefrom.

7. The combination with a focusing screen, and a cover therefor hinged at one side thereof, of a tubular hood surrounding the screen and collapsible longitudinally above the screen and beneath the cover to a position in which its intermediate portion is disposed as an entirety between its two ends, and connections between the hood and cover for effecting an automatic movement of one through movement of the other.

8. The combination with a focusing screen and a cover therefor hinged at one side thereof, of a tubular hood surrounding the screen and collapsible longitudinally above the screen and beneath the cover to a position in which its intermediate portion is disposed as an entirety between its two ends, and connections between the hood and cover for effecting an automatic movement of one through movement of the other comprising a link hinged to the cover and pivoted to the outer end of the hood upon an axis extending substantially centrally and transversely thereof to permit the hood to be collapsed with its ends in a substantially superposed relative position above the screen and beneath the cover.

CHARLES E. HUTCHINGS.

Witnesses:
J. A. ROBERTSON,
MAY WARN.